Patented June 19, 1934

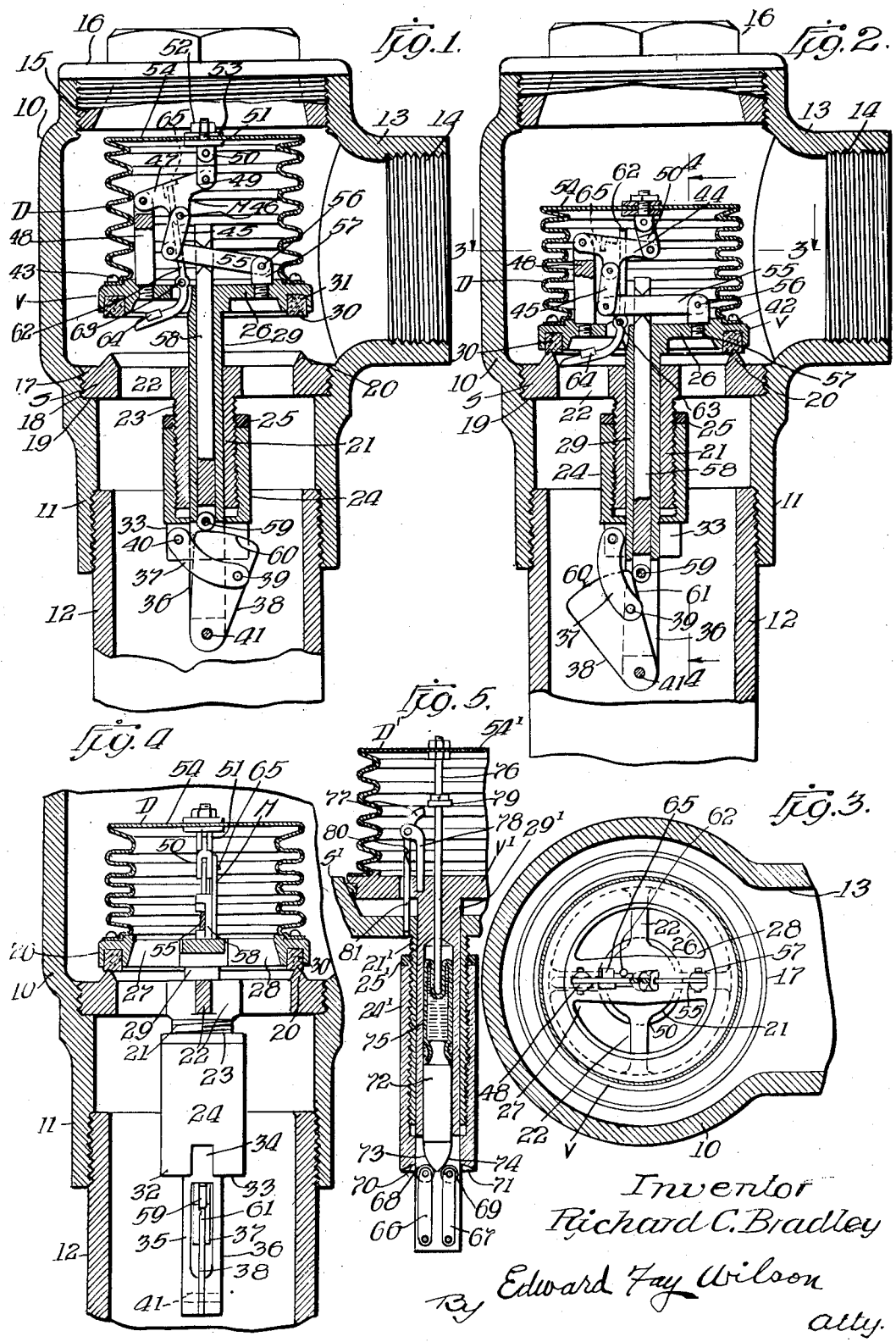
June 19, 1934.   R. C. BRADLEY   1,963,518
VALVE
Filed Feb. 2, 1931
Inventor
Richard C. Bradley
By Edward Fay Wilson
atty.

1,963,518

UNITED STATES PATENT OFFICE 1,963,518

VALVE

Richard C. Bradley, Chicago, Ill., assignor of one-half to F. D. Farnam, Chicago, Ill.

Application February 2, 1931, Serial No. 512,878

16 Claims. (Cl. 251—114)

This invention relates to valves and more particularly to valves used in connection with fluid pump systems; and has special reference to the provision of a fluid acting valve capable of being seated to effectively prevent leakages in the pump system.

One of the essential requirements in pump systems such as, for example, in gasolene pumps now widely employed in gasolene service stations for pumping and delivering gasolene in accurately measured quantities relates to the employment of valve mechanism in the pump lines capable of being moved to closed or seated position in a manner to prevent return flow of the fluid, such, for example, as the gasolene, correctness of the measure of gasolene delivered by the pump being directly dependent upon the fidelity and accuracy of the action of the valve. A common form of valve used in these gasolene pump systems comprises a valve member or head gravitationally movable towards its seat and aided in such motion by the return movement of the pump piston, the seating of the valve member on the valve seat being effectuated by the gravity of the parts and the pressure on the valve due to the liquid "head" and "foot" pressure active thereon. In the extensive employment of these valves in gasolene pumps I have found that the seating of the valves in operation is ineffectual to prevent leakage of fluid therethrough, this being especially true when the liquid, as is common, contains impurities and foreign substances which settle or deposit themselves unevenly on the valve seat or become interposed between the valve seat and the valve member, the seating of the valve member under such conditions responsive to the gravity of the parts and fluid pressure being ineffectual to retain the gasolene in the pump cylinder and prevent return flow thereof into the gasolene lines by seepage and leakage through the valve itself, as is essential in measuring pumps. For the purpose of eliminating the defects and operating disadvantages in these prior valves utilized in pump systems of this nature, my present invention comprehends the provision of a valve construction especially adapted for use in fluid pump systems in which the valve head or member may be effectively seated in a positive manner, the valve member being seated and located in seated position in a manner such that seepage or leakage of liquid through the valve is effectively minimized and prevented.

The principal objects of my present invention may be said to include, besides the provision of a valve construction having the characteristics and performing the functions above mentioned, the further provision of a valve construction having means for multiplying the fluid pressure active on the valve for positively seating the valve head or member; the further provision of a valve of this type in which the said means includes a movable diaphragm or bellows arrangement mounted on the valve member or head, the said movable diaphragm or bellows being influenced by the fluid pressure on the pump side of the valve, and the suction on the other side thereof, and operative for transmitting pressure at a multiplied power to the valve member for seating the same and the provision of a valve construction of the type referred to in which the parts are of relatively simple construction and capable of efficient operation for the purposes designed.

To the accomplishment of the foregoing, and such other objects as may hereinafter appear, my invention consists in the elements and their relation one to the other, as hereinafter particularly described and sought to be defined in the claims, reference being had to the accompanying drawing which shows preferred embodiments of my invention, and in which:

Figure 1 is an elevational view in cross section of my valve construction showing the valve in open position;

Figure 2 is a similar view thereof showing the valve in closed or seated position;

Figure 3 is a view taken in cross section on the line 3—3, Figure 2;

Figure 4 is an elevational view taken in cross section on the line 4—4, Figure 2; and Figure 5 is a view of a modification.

As heretofore mentioned, the valve construction of my invention is intended, for example, for application to fluid pump systems and my present construction is shown as applied to such a system. To this end, I may provide the valve casing 10 provided with the vertical pipe section 11 adapted for threaded connection to the vertical stand pipe 12, the latter leading to a source of fluid such as gasolene supply, which usually comprises a gasolene tank mounted at a low elevation, the valve casing 10 being further provided with a horizontal pipe section 13 internally threaded as at 14 for receiving piping connected to the gasolene pump cylinder. For gaining access to the valve members the valve casing 10 is preferably provided with the handhole 15, the said handhole being closed by the threadedly received cap or closure member 16 as is common in these devices. Although I disclose my valve construction as applied to a fluid pump system, it will be apparent and understood that my valve construction is not intended to be limited to such use, my valve being broadly capable of application and use wherever similar problems are involved.

As heretofore mentioned, a common defect in valves employed at present in fluid pump systems resides in the fact that the seating of the valve member on the valve seat in the casing such as 10 is ineffectual and insufficient to prevent movement of the gasolene or other fluid from the pump cylinder through the valve mechanism, into the stand pipe 12 and back into the source of fluid supply such as the tank mentioned, seepage of gasolene and backward movement thereof resulting in a shortage of measure of gasolene in the pump cylinder and inaccuracy of gasolene delivery to customers and consumers. To the end of preventing this shortage in measure and the seepage and the back leakage of the gasolene in these pump systems I provide a valve in which the valve member or head may be positively seated on the valve seat with a pressure greater than the pressure acting on the valve due to the liquid "head" on one side and the liquid "foot" on the other side thereof, means being provided for multiplying the active pressure on the valve with the multiplied pressure effective for positively seating the valve member and drawing the same further onto the valve seat to provide the desired sealed closure between the valve parts. More specifically, my invention comprehends the provision of a movable diaphragm or bellows member or the like preferably arranged on the valve member, the diaphragm member being capable of expansion and contraction on the valve member, a relatively large displacement of the diaphragm member being utilized for effecting a lesser displacement of the valve member with multiplied power. To the accomplishment of these ends, my valve construction comprises the seat member generally designated as S, the valve or gate member generally designated as V, the movable diaphragm member D on the gate member and means M for reducing the motion of the diaphragm member and multiplying the power active thereon for positively seating the valve member V.

The seat member S of my construction preferably comprises an annular element externally threaded as at 17 and received by the internal threads 18 provided in the valve casing 10, the valve casing being further provided with the shoulder member 19 for limiting the motion of the seat member S in the valve casing, the said annular element being provided further with the annular seat portion 20. The seat member S is provided with the preferably centrally arranged sleeve stem portion 21, the latter being formed preferably integrally with the annular seat member and connected thereto by the preferably integral web or spider member 22. The stem 21 in the present form of my construction is preferably externally threaded as at 23 for receiving the correspondingly internally threaded sleeve member 24, the said sleeve member being adjustably received on the stem portion 21 for a purpose as will appear clearer hereinafter, the said sleeve member being locked in adjusted position by means of the lock nut 25.

The valve member or head V co-operating with the seat member S comprises in the present form of my construction a gate or disk movable relatively to the seat member S, the said valve member being to this end provided with the disk or gate portion 26 provided with suitable orifices such as 27 and 28 and a sleeve stem member 29 formed preferably integrally with the gate portion 26, the said sleeve member 29 being co-axially arranged with the seat sleeve member 21 and slidable therein, as will clearly appear from a consideration of the drawing. The valve member V is provided, as is usual in this type of construction, with the ring or annulus 30 received in a suitable annular recess 31, the said ring or annulus being made of cork, rubber or other resilient material.

For the purpose of drawing the valve member V onto the seat member S I provide means interposed between the said members, the said means being adapted to be operated for positively seating the valve member. To this end the sleeve member 24 forming part of the valve seat is bifurcated at its bottom and provided with the bifurcations 32 and 33 and the central channel 34, the stem 29 of the valve member V being similarly bifurcated at its bottom end and provided with the bifurcations 35 and 36 and connecting the bifurcated ends of the sleeve member 24 and the stem 29 I provide the toggle links 37 and 38 pivoted together as at 39, the former being pivotally anchored between the bifurcations 32 and 33 as at 40, the latter being pivotally anchored to the stem bifurcations 35 and 36 as at 41. The link 38 is preferably made sector shape for a purpose as will appear presently.

With this construction it will be apparent that upon movement of the sector link 38 into the position shown in Figure 2 of the drawing and into toggle closing position, the valve member V will be drawn onto the seat member S, the character of the seating of the valve member being dependent upon the force applied to the sector link 38 to draw the toggle links into closing or substantially closing position. With this construction it will be further apparent that the seating of the valve member may be adjusted by the regulation or adjustment of the sleeve member 24 on the seat spindle 21 and it is to this end that the adjustable sleeve member 24 above referred to is provided.

For actuating the toggle links 37 and 38 to effect a positive seating of the valve member V I provide the diaphragm in the form of a bellows means D, heretofore mentioned, and the multiplying power system M associated therewith. The bellows D comprises an expansible and collapsible member made of sheet metal, the said member being provided with the bottom flange portion 42 attached to the valve member V as by means of the screws or other securing means 43, the joint or connection between these parts being made in any approved liquid seal fashion. The expansible and contractible bellows D in operation is responsive to the differential pressures acting on the valve, the said bellows D being moved to expanded condition when suction is effected in the pump side of the valve, the said bellows being adapted to be moved to contracted or collapsed condition upon application of pressure on the pump side of the valve.

When the bellows or diaphragm member D is moved to collapsed condition under the influence of fluid pressure thereon resulting from the liquid "head" and "foot" pressure on opposite sides of the same, the diaphragm has a relatively large displacement and this displacement is utilized for effecting a smaller displacement in the valve member V with a multiplied pressure. To the accomplishment of these ends the multiplying pressure means M is provided, and referring to the drawing, the said means M in Figures 1 to 4 of the drawing comprises, generically, a multiplying lever system functioning to transmit movement of the diaphragm or bellows D to movement of the link members 37 and 38 for drawing the valve member further onto its seat. The multiplying lever system may comprise the toggle links 44 and 45 pivoted at their adjacent ends as at 46, the link 44 comprising preferably a lever having its arm 47 pivoted on a stationary post 48 threadedly connected to the valve member V and having its other arm 49 pivotally connected to a link member 50, the latter being, in turn, pivoted to the securing means 51 attached as by means of the nut 52 and interposed washer 53 to the diaphragm portion 54 of the bellows D, the connection between these parts being made fluid proof in any desired fashion. Connected to the link 45 I further provide the lever 55 anchored as at 56 to a stationary post 57, threadedly attached to the valve member V, the said lever 55 being received by and arranged for moving a central stem or spindle 58, the latter being slidably movable in the valve sleeve stem 29 and being provided at its bottom end with a roller or follower 59 adapted to ride over the cam surface 60 of the sector shape link 38.

With the provision of this construction it will be apparent that with the parts as shown in Figure 1 of the drawing (showing the valve member in unseated or open position) the cam surface 60 of the sector shape link 38 prevents the descent or downward motion of the central stem or spindle 58, this preventing the collapsing of the bellows D with the valve in open position. It will be further apparent that when the valve and attached portions are moved to closed position as by the gravity of the parts, the sector link 38 is brought into position, as shown in Figure 2 of the drawing, and with the parts thus arranged the slidable stem 58 is free to be moved downwardly, the roller 59 being then in position to be moved over the end of the cam surface 60 and onto the side surface 61 of the sector link 38. With the spindle or stem 58 free to move and the valve parts in seated position the bellows D under the influence of the pressure active on the diaphragm 54, is capable of moving to collapsed or contracted condition, this being shown in Figure 2 of the drawing, and when the bellows is moved to this condition the multiplying lever mechanism M is actuated to impart the downward motion to the spindle 58 to effect the movement of the sector link 38 to draw the valve member V onto the seat S. With the provision of these parts it will be further understood that the relatively large displacement of the diaphragm 54 is transmitted with multiplied power and force to effect the relatively small displacement of the valve member V to obtain a positive and firm seating of the valve member V on the seat S. It will be further apparent that upon application of suction in the pump side of the valve the pressure on the diaphragm will be released and continued suction will move the diaphragm 54, bellows D and the valve V to open position, as shown in Figure 1 of the drawing.

When the parts are moved to open position as shown in Figure 1 of the drawing, it is requisite and essential that the bellows D be maintained or retained in expanded condition and to this end I provide locking means for retaining the parts in the position shown in Figure 1 of the drawing. It is to this end that the link 38 is made sector shape, the cam surface 60 thereof preventing the downward motion of the spindle 58. To the end of assuring the locking of the parts I may provide the lever 62 pivoted as at 63 on the valve member, the said lever being provided with the weighted lower arm 64 so that the lever will normally assume the position shown in Figure 1 of the drawing and engage the stop member 65 arranged on the lever 44, the weighted lever 62 sustaining the multiplying lever mechanism M upon interlocking with the stop member 65. When the valve parts are moved to descended position for seating, the weighted arm 64 engages one of the ribs of the spider 22 and is moved into the position shown in Figure 2 of the drawing for releasing the lever 44 and permitting the collapsing the bellows D and the movement of the multiplying mechanism M. It will be therefore noted that with my construction the bellows is positively locked in open position, the said bellows being capable of moving to collapsed condition only after the valve member V has moved onto the seat member S.

In lieu of providing a multiplying power lever system for transmitting motion of the diaphragm to the valve member with increased power, I may provide other means for accomplishing the same result, Figure 5 of the drawing showing a modification in which hydraulic means may be provided to this end.

Referring to Figure 5, I show the valve member V' provided with the sleeve stem 29' movable in the seat stem 21' of the seat member S', the said seat stem 21' being provided in a manner similar to the form shown in Figures 1 to 4 of the drawing, with the adjustable sleeve element 24' locked in position by means of the lock nut 25'. Interposed between the sleeve member 24' and the valve stem 29' and operative for drawing the valve stem into seated position I provide the oppositely positioned pivoted arms 66 and 67 pivoted on the bifurcated end of the valve stem 29' the said arms being provided with the rollers 68 and 69, respectively, movable into position and over the cam surfaces 70 and 71 provided at the bottom of the sleeve member 24'. With this construction it will be apparent that upon outward movement of the arms 66 and 67 the rollers 68 and 69 will move over the cam surfaces 70 and 71 and as the arms are actuated outwardly the valve member V' is brought into firmly seated relation on the seat S'. For actuating the arms outwardly I provide the slidable anchor shaped piece 72, the latter slidably movable within the sleeve stem 29', the anchor shaped piece 72 being provided with the oppositely positioned cam surfaces 73 and 74 for co-operation with the rollers 68 and 69 to move the same outwardly for seating the valve. For transmitting motion of the bellows D' in this form of my construction to reduce motion of the anchor shaped piece 72, I provide a hydraulic pressure means comprising the resilient bladder 75 holding or containing a suitable fluid such as oil, the said bladder being arranged or located within the sleeve stem 29' and connected to the upper end of said bladder I provide the stem or spindle 76, the latter being secured to the diaphragm portion 54' of the bellows D', the said spindle 76 having a diameter substantially smaller than the diameter of the anchor shaped piece 72.

With this construction it will be obvious that a relatively large displacement of the diaphragm 54' will effect a relatively small displacement of the anchor shaped piece 72, the valve being thus seated with increased power. For suitably locking the diaphragm 54' when the same is moved to open position to prevent collapsing of the same with the valve member open, I may provide the pivot arm 77 pivoted on a stationary post 78 and movable by gravity into underlying position with respect to the stop member 79 when the valve member V' is moved to open position, the co-operation between the arm 77 and stop member 79 preventing collapsing of the diaphragm 54' as will be apparent. When the valve member V' is seated the cam portion 80 of the arm 77 contacts with a similarly cammed post 81, the co-operation of these parts moving the arm 77 to unlocking position, as shown in Figure 5 of the drawing, collapsing of the diaphragm 54' and bellows D being thereafter permitted.

The installation and operation of my valve mechanism will, in the main, be apparent from the above detailed description thereof. It will be further apparent that I have provided a valve mechanism in which the pressure such as fluid pressure operative on the valve when the same is seated influences the valve to further seat the same and to bring about a positive seating with a multiplied power of pressure.

Although I have disclosed specific embodiments of my invention, it will be understood that the same may be modified within wide variations and other means may be employed responsive to pressure or for multiplying the active pressure on the valve due to the fluid or liquid "head" or "foot" pressure or for transmitting motion of the diaphragm to effect positive valve seating.

For example, I need not employ such means as a bellows, since movable diaphragms, disks or pistons may be employed with equal effect. Moreover, other mechanical, pneumatic or hydraulic means may be employed for transmitting movement of the diaphragm to the valve member or head. I desire it to be understood that my invention is not intended to be limited to any of such means, my invention comprehending broadly the utilization of all such means as come within the purview of the following claims.

I claim:

1. A back pressure valve comprising a valve seat, a valve head and means including a flexible diaphragm carried solely by the valve head for multiplying the differential head and foot pressure active on the valve for positively seating the valve head.

2. A valve comprising a valve seat, a valve head and means influenced by pressure active on said valve head for positively seating the same, the said means including a movable flexible diaphragm mounted solely on said head.

3. A valve comprising a valve seat, a valve head and means influenced by pressure active on the valve head for positively seating the same, the said means including a movable diaphragm mounted solely on said head and provisions for transmitting motion of said diaphragm to said head with increased power.

4. A valve comprising a valve seat, a valve head and means influenced by pressure active on the valve head for positively seating the same, the said means including a movable diaphragm carried solely by the valve head and positioned to be influenced by the head and foot pressure of the fluid active on the valve and provisions for transmitting motion of said diaphragm to said head with increased power.

5. A valve comprising a valve seat, a valve head and means influenced by pressure active on the valve head for positively seating the same, the said means including a movable diaphragm mounted solely on said head and provisions connecting the diaphragm, head and seat for transmitting motion of said diaphragm to said head with increased power.

6. In a valve, a valve seat, a valve head comprising a gate member and a movable diaphragm mounted solely thereon and means for transmitting motion of said diaphragm to said gate member with increased power for positively seating the same.

7. In a valve, a valve seat, a valve head comprising a gate member and a movable diaphragm mounted solely thereon and means connecting the diaphragm, gate member and seat for transmitting motion of said diaphragm to said gate member with increased power for positively seating the same.

8. In a valve, a valve seat, a valve head including a gate member and an expansible bellows mounted solely thereon, the said bellows being responsive to differential pressure operative on the same and means for transmitting motion of said expansible bellows to said gate member with multiplied power for positively seating the gate member on the valve seat.

9. A valve comprising a valve seat, a valve head and means including a flexible diaphragm carried solely by the valve head and influenced by pressure active on said valve for multiplying said pressure and positively seating the said valve head, the said means being operable after the valve head is moved to seated position.

10. A valve comprising a valve seat, a valve head and means influenced by pressure active on said valve for positively seating the said valve head, the said means being operable after the valve head is moved to seated position and provisions for preventing operation of the said means when the valve head is moved to open position.

11. In a valve, a valve seat, a valve head comprising a gate member and a movable diaphragm mounted solely thereon and means for transmitting motion of said diaphragm to said gate member with increased power for positively seating the same, the said diaphragm being movable to effect said positive seating after the gate member is moved to seated position.

12. In a valve, a valve seat, a valve head comprising a gate member and movable diaphragm mounted solely thereon, means for transmitting motion of said diaphragm to said gate member with increased power for positively seating the same, the said diaphragm being movable to effect said positive seating after the gate member is moved to seated position and provisions for preventing movement of said diaphragm after said gate member is moved to open position.

13. In a valve, a valve seat, a valve head including a gate member and an expansible bellows thereon, the said bellows expanding and collapsing responsive to differential fluid pressure operative on the same and means for transmitting collapsing motion of said bellows to said gate member with multiplied power for positively seating the gate member on the valve seat, the said means being operable after the gate member is moved to seated position, the construction being such that the bellows is moved to expanded condition upon opening of the gate and provisions for preventing collapsing of the bellows after the said gate member is moved to open position.

14. A valve comprising a valve seat member having a stem, a valve member having a stem movable in the seat stem, provisions interposed between the said stems and operative for seating the valve member on the seat with increased pressure after the valve member is seated and including a movable diaphragm mounted solely on said valve member and means interposed between the diaphragm and the said provisions operative for transmitting motion of the former to the latter for producing said increased seating pressure.

15. A valve comprising a valve seat member having a stem, a valve member having a stem movable in the seat stem, provisions interposed between the said stems and operative for seating the valve member on the seat with increased pressure after the valve member has been seated, a movable diaphragm mounted solely on said valve member and means interposed between the diaphragm and the said provisions operative for transmitting motion of the former to the latter for producing said increased seating pressure, the said means comprising a multiplying power lever system.

16. A valve comprising a valve seat member having a hollow stem, a valve member having a hollow stem slidable in the seat stem, provisions connecting the said stems and operative for seating the valve member on the seat with increased pressure after the valve member has been seated, a movable diaphragm mounted solely on said valve member and means interposed between the diaphragm and the said provisions operative for transmitting motion of the former to the latter for producing said increased pressure, the said means including a spindle movable in said second hollow stem and a system of multiplying power levers for moving the same.

RICHARD C. BRADLEY.